US010912313B2

(12) United States Patent
Bouman et al.

(10) Patent No.: US 10,912,313 B2
(45) Date of Patent: Feb. 9, 2021

(54) METHOD FOR PREPARATION OF AN OIL-IN-WATER EMULSION

(71) Applicant: Conopco, Inc., Englewood Cliffs, NJ (US)

(72) Inventors: Tjerk Bouman, Delft (NL); Hubertus Cornelis van Gastel, Zwijndrecht (NL); Astrid Hauser, Rotterdam (NL)

(73) Assignee: Conopco Inc., Englewood Cliffs, NJ (US)

(*) Notice: Subject to any disclaimer, the term of this patent is extended or adjusted under 35 U.S.C. 154(b) by 446 days.

(21) Appl. No.: 15/038,604

(22) PCT Filed: Nov. 3, 2014

(86) PCT No.: PCT/EP2014/073515
§ 371 (c)(1),
(2) Date: May 23, 2016

(87) PCT Pub. No.: WO2015/086223
PCT Pub. Date: Jun. 18, 2015

(65) Prior Publication Data
US 2016/0295875 A1 Oct. 13, 2016

(30) Foreign Application Priority Data
Dec. 10, 2013 (EP) ..................... 13196457

(51) Int. Cl.
A23D 7/015 (2006.01)
A23D 7/02 (2006.01)
A23L 27/60 (2016.01)
A23L 33/24 (2016.01)
A23D 7/005 (2006.01)
A23L 35/00 (2016.01)

(52) U.S. Cl.
CPC .......... *A23D 7/015* (2013.01); *A23D 7/0053* (2013.01); *A23D 7/02* (2013.01); *A23L 27/60* (2016.08); *A23L 33/24* (2016.08); *A23L 35/10* (2016.08); *A23V 2002/00* (2013.01)

(58) Field of Classification Search
CPC ........ A23D 7/015; A23D 7/0053; A23D 7/02; A23L 33/24; A23L 27/60; A23L 35/10
USPC ....................................... 426/605
See application file for complete search history.

(56) References Cited

U.S. PATENT DOCUMENTS

| | | | |
|---|---|---|---|
| 5,011,701 A | 4/1991 | Baer et al. | |
| 2005/0271790 A1 | 12/2005 | Aronson et al. | |
| 2006/0115564 A1 | 6/2006 | Passarelli et al. | |
| 2007/0172572 A1* | 7/2007 | Aquino | A23D 7/005 426/602 |
| 2010/0233342 A1 | 9/2010 | Cristhian et al. | |
| 2010/0291280 A1 | 11/2010 | Blijdenstein et al. | |
| 2013/0131012 A1* | 5/2013 | Gusek | A23L 2/52 514/57 |

FOREIGN PATENT DOCUMENTS

| | | |
|---|---|---|
| CA | 2540770 A1 | 5/2005 |
| HU | 37008 | 11/1985 |
| WO | 9427451 A1 | 12/1994 |
| WO | WO9733688 | 9/1997 |
| WO | WO02069737 | 3/2003 |
| WO | 2005039310 A1 | 5/2005 |
| WO | WO2005039316 | 5/2005 |
| WO | WO2005107500 | 11/2005 |
| WO | WO2008062057 | 5/2008 |
| WO | 2010102920 A1 | 9/2010 |
| WO | WO2012016201 | 2/2012 |
| WO | WO2012046072 | 4/2012 |
| WO | WO2012072335 | 6/2012 |
| WO | WO2012104398 | 8/2012 |
| WO | WO2013092086 | 6/2013 |
| WO | WO13109721 | 7/2013 |

OTHER PUBLICATIONS

Goudappel et al., Measurement of Oil Droplet Size Distributions in Food Oil/Water Emulsions by Time Domain Pulsed Field Gradient NMR, Journal of Colloid and Interface Science, 2001, 535-542, vol. 239.
IPRP2 in PCTEP2014073515, dated Dec. 1, 2015.
Search Report and Written Opinion in EP13196457, dated Mar. 5, 2014.
Search Report and Written Opinion in PCTEP2014073515, dated Jan. 26, 2015.
Lampe et al., "Effect of medium hydrostatic pressure on the properties of wheat flour main biopolymers", Journal of Cereal Science 57 (2013) 411-417.
Bolumar et al., "Structural Changes in Foods Caused by High-Pressure Processing", Springer Science+Business Media New York 2016, V.M. Balasubramaniam et al. (eds.), High Pressure Processing of Food, Food Engineering Series, DOI 10.1007/978-1-4939-3234-4_23.
Dapcevic Hadnadev et al., "Influence of oil phase concentration on droplet size distribution and stability of oil-in-water emulsions", Eur. J. Lipid Sci. Techno!.2013, 115, 313-321.

* cited by examiner

*Primary Examiner* — Jeffrey P Mornhinweg
(74) *Attorney, Agent, or Firm* — N.V. Nederlandsch Octrooibureau; Catherine A. Shultz; Tamara C. Stegmann

(57) ABSTRACT

The objective of the present invention is to provide a method for preparation of an oil-in-water emulsion, such as a mayonnaise, having a reduced oil content. Such reduced oil emulsion nevertheless should have the same properties as the higher oil variants. This objective has been met by a method wherein a dispersion of cellulosic fibres is heated, before being mixed with other ingredients of the emulsion. Either the dispersion of cellulosic fibres is homogenised in a high pressure homogeniser at relatively high pressure, or the final emulsion containing the dispersion of cellulosic fibres is homogenised in a high pressure homogeniser at relatively high pressure.

19 Claims, 1 Drawing Sheet

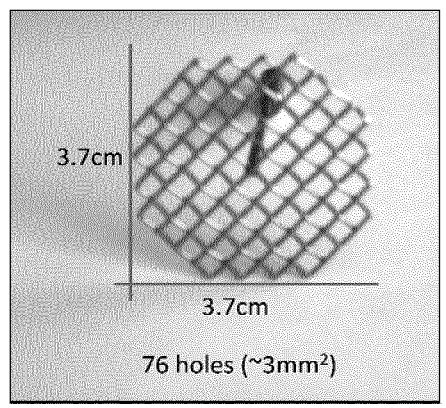

METHOD FOR PREPARATION OF AN OIL-IN-WATER EMULSION

The present invention relates to a method for preparation of an oil-in-water emulsion, and also relates to the packaged oil-in-water emulsion prepared by the method.

BACKGROUND OF THE INVENTION

Traditionally mayonnaises have an oil content of about 75 to 80% of its weight. Nowadays consumers tend to decrease the caloric intake of the food they consume, hence mayonnaise manufacturers market mayonnaises with lower oil content. These oil-in-water emulsions with less fat are not as stable as the mayonnaises with high fat content, therefore generally these emulsions are stabilised using thickeners like starch, gums, and cellulosic fibres. In order to minimise the use of raw materials, the manufacturers would like to reduce the addition of these stabilisers, without however compromising on the emulsion stability.

WO 2012/104398 A1 relates to a process for preparing an oil-in-water emulsion.

WO 2008/0062057 A1 relates to an edible substitute for chemically modified starch.

WO 2005/039316 A1 relates to an edible emulsion comprising dairy base and fibres. This reference is silent about heating a dispersion of cellulosic fibres wherein the concentration of oil is maximally 1% by weight.

WO 2012/046072 A1 relates to edible emulsions, and to a method for preparing those emulsions.

WO 2013/109721 A2 relates to a process for obtaining citrus fibre from citrus peel, which may include steps like heating and homogenisation of the citrus peel. This reference is silent about heating of a dispersion of cellulosic fibre before mixing with ingredients of an oil-in-water emulsion to prepare an oil-in-water emulsion.

U.S. Pat. No. 5,011,701 relates to low-calorie, substantially fat-free food products such as viscous or pourable dressings. The products contain microcrystalline cellulose which has been pre-treated to fragment the cellulose.

SUMMARY OF THE INVENTION

Among consumers there is a need for low-fat mayonnaise type dressings, which are stable and which have similar properties as full-fat mayonnaise. Therefore the food industry has a need for ingredients for preparation of oil-in-water emulsions with a low fat oil content, and a process for preparing the emulsion. The ingredients and process should be able to stabilise the emulsion during their shelf-life of months, provide a good sensory profile with regard to viscosity, stickiness, and creaminess, and that can be used to decrease the oil level of the emulsions. Moreover, consumers more and more require from food manufacturers to provide them products that contain only natural ingredients and that do not contain ingredients that may be considered to be artificial.

These objectives have been met by a method for preparation of an edible oil-in-water emulsion, containing cellulosic fibres. These cellulosic fibres are heated in water, and subsequently this dispersion of cellulosic fibres is subjected to a high pressure homogenisation treatment at a relatively high pressure. The dispersion of cellulosic fibres may be mixed with the other ingredients of the edible emulsion before or after the high pressure homogenisation step, to prepare the edible emulsion. In case the cellulosic fibre dispersion is homogenised at relatively high pressure, before it is being mixed with the other ingredients, then the final emulsion is prepared by homogenising the emulsion at a relatively low shear rate.

This heating of cellulosic fibres and homogenisation at relatively high pressure has the advantage that an oil-in-water emulsion can be prepared, which has reduced oil content, but has the properties of an emulsion with higher oil content. The cellulose fibres are activated in the heating step. Only one homogenisation step at high pressure is required to prepare an oil-in-water emulsion with the desired properties, and no difficult or long intermediate steps are required in the preparation of intermediate phases of the final emulsion.

Accordingly in a first aspect the present invention provides a method for preparation of an oil-in-water emulsion comprising the steps:

a) providing an aqueous dispersion of cellulosic fibres comprising citrus fibres or tomato fruit fibres at a concentration ranging from 1 to 5% by weight, wherein the concentration of oil is maximally 1% by weight, and wherein the dispersion has been subjected to a heating process at a temperature of at least 30° C.;

b) optionally homogenising the dispersion from step a) in a high pressure homogeniser at a pressure of at least 250 bar;

c) mixing the dispersion from step a) or, in case step b) has been performed the dispersion from step b), with
20% to 80% by weight of water,
5% to 70% by weight of oil,
0.1% to 5% by weight of one or more food acids, and
0% to 10% by weight of dry matter from other edible ingredients,
to prepare a pre-emulsion having a pH ranging from 2 to 5; and d) homogenising the mixture from step c) to produce the emulsion having oil droplets with a volume weighted geometric mean droplet size D3,3 of less than 10 micrometer, and in case the mixture from step a) has been combined with the other ingredients of the emulsion in step c), without performing step b), then homogenisation is performed in a high pressure homogeniser at a pressure of at least 350 bar, preferably at least 450 bar.

In a second aspect the present invention provides a packaged composition in the form of an oil-in-water emulsion obtained by the method according to the first aspect of the invention.

DETAILED DESCRIPTION

All percentages, unless otherwise stated, refer to the percentage by weight (wt %). In the context of the present invention, an average droplet diameter is generally expressed as the D3,3 value, which is the volume weighted geometric mean droplet size.

In a first aspect the present invention provides a method for preparation of an oil-in-water emulsion comprising the steps:

a) providing an aqueous dispersion of cellulosic fibres comprising citrus fibres or tomato fruit fibres at a concentration ranging from 1 to 5% by weight, wherein the concentration of oil is maximally 1% by weight, and wherein the dispersion has been subjected to a heating process at a temperature of at least 30° C.;

b) optionally homogenising the dispersion from step a) in a high pressure homogeniser at a pressure of at least 250 bar;

c) mixing the dispersion from step a) or, in case step b) has been performed the dispersion from step b), with
20% to 80% by weight of water,
5% to 70% by weight of oil,
0.1% to 5% by weight of one or more food acids, and 0% to 10% by weight of dry matter from other edible ingredients,
to prepare a pre-emulsion having a pH ranging from 2 to 5; and
d) homogenising the mixture from step c) to produce the emulsion having oil droplets with a volume weighted geometric mean droplet size D3,3 of less than 10 micrometer, and in case the mixture from step a) has been combined with the other ingredients of the emulsion in step c), without performing step b), then homogenisation is performed in a high pressure homogeniser at a pressure of at least 350 bar, preferably at least 450 bar.

In this process either the dispersion from step a) is homogenised in a high pressure homogeniser at a pressure of at least 250 bar in step b), before being mixed with the other ingredients of the emulsion in step c), or the mixture from step c) is homogenised in a high pressure homogeniser at a pressure of at least 350 bar, preferably at least 450 bar. The high pressure homogenisation leads to a good activation of the cellulosic fibres, and, combined with the heating of the cellulosic fibres, cellulosic fibres are obtained which have a good binding capacity for water. Therewith they have a strong thickening and stabilising effect on the emulsion, which leads to the reduction of the oil content of the emulsion. This is not only beneficial for the caloric content of the emulsion, which is reduced. It also is more sustainable, because less oil needs to be sourced from vegetable materials. Moreover the cellulosic fibre are natural materials, therefore the emulsion contains natural ingredients and not ingredients that may be considered to be artificial.

Therefore the present invention preferably provides a method for preparation of an oil-in-water emulsion comprising the steps:
a) providing an aqueous dispersion of cellulosic fibres comprising citrus fibres or tomato fruit fibres at a concentration ranging from 1 to 5% by weight,
wherein the concentration of oil is maximally 1% by weight, and
wherein the dispersion has been subjected to a heating process at a temperature of at least 30° C.;
b) homogenising the dispersion from step a) in a high pressure homogeniser at a pressure of at least 250 bar;
c) mixing the dispersion from step b) with
20-80 wt % water,
5-70 wt % oil,
0.1-5 wt % of one or more food acids, and
0-10 wt % of dry matter from other edible ingredients,
to prepare a pre-emulsion having a pH ranging from 2 to 5; and
d) homogenising the mixture from step c) to produce the emulsion having oil droplets with a volume weighted geometric mean droplet size D3,3 of less than 10 micrometer.

Alternatively, the present invention preferably provides a method for preparation of an oil-in-water emulsion comprising the steps:
a) providing an aqueous dispersion of cellulosic fibres comprising citrus fibres or tomato fruit fibres at a concentration ranging from 1 to 5% by weight, wherein the concentration of oil is maximally 1% by weight, and
wherein the dispersion has been subjected to a heating process at a temperature of at least 30° C.;
c) mixing the dispersion from step a) with
20-80 wt % water,
5-70 wt % oil,
0.1-5 wt % of one or more food acids, and
0-10 wt % of dry matter from other edible ingredients,
to prepare a pre-emulsion having a pH ranging from 2 to 5; and
d) homogenising the mixture from step c) to produce the emulsion having oil droplets with a volume weighted geometric mean droplet size D3,3 of less than 10 micrometer, in a high pressure homogeniser at a pressure of at least 350 bar, preferably at least 450 bar.

Preferably the emulsion is an edible emulsion. Examples of oil-in-water emulsions encompassed by the present invention include mayonnaise, dressings and sauces. Preferably, the oil-in-water emulsion is a mayonnaise or a sauce, most preferably a mayonnaise.

Mayonnaise is generally known as a thick, creamy sauce that can be used as a condiment with other foods. Mayonnaise is a stable water-continuous emulsion of vegetable oil, egg yolk and either vinegar or lemon juice. In many countries the term mayonnaise may only be used in case the emulsion conforms to the 'standard of identity', which defines the composition of a mayonnaise. For example, the standard of identity may define a minimum oil level, and a minimum egg yolk amount. Also mayonnaise-like products having oil levels lower than defined in a standard of identity can be considered to be mayonnaises. These kind of products often contain thickeners like starch to stabilise the aqueous phase. Mayonnaise may vary in colour, and is generally white, cream-coloured, or pale yellow. The texture may range from of light creamy to thick, and generally mayonnaise is spoonable. In the context of the present invention 'mayonnaise' includes emulsions with oil levels ranging from 5% to 85% by weight of the product. Mayonnaises in the context of the present invention do not necessarily need to conform to a standard of identity in any country.

The term 'oil' as used herein refers to lipids selected from triglycerides, diglycerides, monoglycerides and combinations thereof. The oil may be solid or liquid at ambient temperature. Preferably the oil in the context of this invention comprises at least 90 wt % of triglycerides, more preferably at least 95 wt %. Preferably the oil contains less than 20 wt % of solid oil at 20° C., preferably less than 10 wt % solid oil. Most preferred at 20° C. the oil is free from solid oil. Most preferred the oil is liquid at 20° C. Preferred oils for use in the context of this invention are edible oils which are liquid at 20° C., preferably vegetable oils which are liquid at 20° C. Preferably the oil comprises sunflower oil, rapeseed oil, olive oil, soyabean oil, and combinations of these oils.

The cellulosic fibres of the present invention are insoluble in water. Cellulose is found in plants as microfibrils, which typically have a diameter of 2 to 20 nm. These microfibrils form the structurally strong framework in the cell walls of plant materials. Cellulose is a linear polymer of $\beta$-(1→4)-D-glucopyranose units. Cellulose molecules typically consist of 2,000 to 14,000 of such units and are completely insoluble in normal aqueous solutions. When dispersed in an aqueous solution, insoluble cellulosic fibres typically bind considerable amounts of water. Cellulosic fibres may contain other fibrous components such as hemicelluloses, pectins and lignin.

Typically, the water-insoluble cellulosic fibres of the present invention are substantially or completely underivatised. According to a particularly preferred embodiment of the invention the water-insoluble cellulosic fibres are natural cellulosic fibres which have not been chemically modified. Preferably the cellulosic fibres are edible cellulosic fibres.

Unlike, for instance, microcrystalline cellulose, the cellulose molecules within the present water-insoluble cellulosic fibres are essentially non-hydrolysed. Typically, the cellulose molecules contained within the water-insoluble cellulosic fibres employed in accordance with the present invention contain at least 1,000, preferably at least 2,000 β-(1→4)-D-glucopyranose units.

Preferably in step a) the concentration of cellulosic fibre ranges from 2% to 5% by weight, preferably from 2.5% to 4.7% by weight. More preferably, in step a) the concentration of cellulosic fibre ranges from 2.5% to 4.5% by weight, more preferably from 3% to 4.5% by weight. Preferably the concentration of the cellulosic fibre in the emulsion prepared in step d) ranges from 0.5% to 4% by weight, preferably from 1% to 4% by weight, preferably from 1.5% to 4% by weight, preferably from 2% to 3.5% by weight.

Water-insoluble cellulosic fibres originating from fruit yield particularly satisfactory results, although the cellulosic fibres may originate from vegetables as well. The cellulosic fibres comprise citrus fibres or tomato fruit fibres. Preferably the insoluble cellulosic fibres are water-insoluble citrus fibres. Most preferably, the water-insoluble citrus fibres originate from the albedo and/or the flavedo of citrus fruits.

A suitable commercially available citrus fibre is for example Herbacel Type AQ Plus Type N, ex Herbafood Ingredients GmbH (Werder (Havel), Germany). These citrus fibres contain not only cellulose, but also water soluble compounds (Food Technologie 03/00). Citrus fibre contains for example hemicelluloses and pectin in addition to cellulose (Food Ingredients and Analysis, May/June 2001).

The water-insoluble cellulosic fibres employed in the oil-in-water emulsion of the present invention typically have a length of 1 to 200 micrometer. Preferably, the cellulosic fibres have an average length ranging from 5 to 100 micrometer, more preferred ranging from 10 to 80 micrometer.

The concentration of oil in the mixture of step a) is less than 1% by weight. Preferably the concentration of oil in the mixture in step a) is less than 0.5% by weight, preferably less than 0.2% by weight, preferably less than 0.1% by weight, preferably the mixture in step a) is substantially free from oil. Most preferred the mixture in step a) is free from oil.

The equipment that is used in step a) to heat the dispersion can be any stirred vessel commonly known to the skilled person. The heating preferably is performed using a vessel with a hot water jacket to heat the contents of the vessel, and preferably while gently stirring the content of the vessel. Alternatively the heating of dispersion may be done in a continuous process, for example in a plate heat exchanger.

Preferably the dispersion from step a) has been subjected to a heating process at a temperature ranging from 30° C. to 99° C., preferably from 35° C. to 99° C., preferably from 40° C. to 99° C. Preferably the temperature is maximally 96° C., more preferred the heating step is performed at a temperature ranging from 50° C. to 95° C. Preferably in step a) the heating is performed during a period ranging from 1 to 20 minutes, preferably ranging from 2 to 10 minutes. Most preferred the heating step is performed during a period ranging from 2 to 6 minutes. This means that the dispersion is kept at the required preferred temperature, during the required preferred time period. Preferably the heating step is performed at atmospheric pressure. Decreasing the pressure lower than atmospheric pressure is not required. This saves energy as compared to a process where a pressure lower than atmospheric pressure is required.

If step b) is performed, then the dispersion from step a) is homogenised in a high pressure homogeniser at a pressure of at least 250 bar, preferably at least 300 bar. Preferably the pressure in that case is maximally 900 bar, more preferred maximally 700 bar. Preferably the pressure ranges from 300 bar to 700 bar, more preferred from 350 bar to 700 bar, more preferred from 350 bar to 600 bar, more preferred from 350 bar to 500 bar. The temperature of the dispersion from step a) preferably ranges from 5 to 95° C. when optionally being homogenised in step b).

In step c) a water-continuous pre-emulsion is prepared containing the dispersion from step a), or in case step b) is performed, the dispersion from step b), and water, oil, one or more food acids, preferably edible acids, and optionally dry matter from other ingredients, preferably edible ingredients. This pre-emulsion is prepared using any conventional method for mixing these ingredients that are known to the skilled person. Preferably the mixture in step c) is prepared under low to moderate shear. Preferably the mixture in step c) is not mixed using high shear equipment, preferably the mixture in step c) is not homogenised using a high pressure homogeniser. Preferably the entire mixture in step c) is not pasteurised or sterilised.

Preferably the emulsion obtained in step d) has a pH ranging from 2.5 to 5, preferably from 3 to 4.5. More preferred the oil-in-water emulsion has a pH ranging from 3 to 4.5, more preferred from 3 to 4, and most preferred a pH ranging from 3.3 to 3.7. One or more food acids are applied to obtain the pH which conforms to these values. To obtain this pH in step d), the mixture in step c) preferably contains 0.05-1.0 wt % of a food acid selected from acetic acid, citric acid, lactic acid, phosphoric acid, and combinations thereof. Acetic acid may be added as a component of vinegar, and citric acid may be added as a component of lemon juice.

The mixture in step c) optionally comprises dry matter from edible ingredients. Preferably the mixture in step c) comprises egg yolk, whole egg, or enzyme modified egg yolk, or combinations thereof. The presence of egg yolk may be beneficial for taste, emulsification and/or stability of the oil droplets. Egg yolk is a good source of phospholipids, and these help to emulsify the oil droplets in the continuous aqueous phase. Typically, phospholipids represent approximately 10% of the wet weight of egg yolk, which is equivalent to about 27% of the total egg yolk lipids. The main components of egg yolk lecithin are phosphatidylcholine (PC, 80%) and phosphatidylethanolamine (PE, 12%). Egg yolk lecithin also contains lysophosphatidylcholine (LPC), sphingomyelin (SM), and neutral lipids in minor quantities. The total concentration of egg yolk in the final emulsion obtained from step d) (whether native or enzyme modified) preferably ranges from 1% to 8% by weight, preferably from 1% to 6% by weight.

Enzyme modified egg yolk means that egg yolk is treated with the enzyme phospholipase, in order to split one or more fatty acid chains from lecithin molecules, mainly from phosphatidylcholine and phosphatidylethanolamine. Preferably the egg yolk is treated with the enzyme phospholipase A2. The emulsifying properties of the enzyme modified egg yolk can be tuned by this enzymatic process. In case the composition contains enzyme modified egg yolk, then preferably the total concentration of egg yolk in the final emulsion obtained from step d) ranges from 0.5 to 4% by weight. Preferably the egg yolk, whole egg, or enzyme modified egg yolk has been pasteurised before being mixed with the other ingredients in step c).

The concentration of oil in the mixture in step c) ranges from 5 to 70% by weight. Preferably the concentration of oil in the emulsion prepared in step d) ranges from 10% to 65% by weight, preferably from 12% to 55% by weight. More preferred the concentration of oil ranges from 12% to 45% by weight, preferably from 15% to 35% by weight of the emulsion prepared in step d).

The ratio between the dispersion from step a) and the ingredients in step c) will depend on the concentration of the ingredients in these mixes and the required concentrations of these ingredients in the emulsion prepared in step d). This ratio can be determined by the skilled person. The temperature of the dispersion from step a) or optionally from step b), preferably ranges from 5 to 95° C. before being mixed with the other ingredients in step c). In case the mixture in step c) contains egg yolk or whole egg and not enzyme modified egg yolk, then the temperature of the dispersion from step a) or optionally from step b), preferably ranges from 5 to 30° C., preferably from 5 to 25° C., before being mixed with the other ingredients in step c). In case the mixture in step c) contains enzyme modified egg yolk, and not egg yolk or whole egg, then the temperature of the dispersion from step a) or optionally from step b), preferably ranges from 5 to 95° C. before being mixed with the other ingredients in step c).

In step d) the oil-in-water emulsion is prepared by homogenising the mixture from step c) to produce the emulsion having oil droplets with a volume weighted geometric mean droplet size D3,3 of less than 10 micrometer. With homogenising in this case is meant that a homogeneous emulsion is prepared, using mixing equipment. In case step b) has been performed, the homogenisation may be done using a conventional mixer for preparing oil-in-water emulsions, such as a regular colloid mill, or another mill as described in WO 02/069737 A2. In case the mixture from step a) has been combined with the other ingredients of the emulsion in step c), without performing step b), then homogenisation is performed in a high pressure homogeniser at a pressure of at least 350 bar, preferably at least 450 bar. Preferably the homogenisation pressure is maximally 900 bar, more preferred maximally 800 bar. Preferably the homogenisation pressure ranges from 350 to bar, more preferred from 450 to 700 bar, and most preferred from 500 to 700 bar. Preferably the homogenisation is carried out at a temperature ranging from 5 to 95° C., more preferred the homogenisation is performed at a temperature ranging from 5 to 30° C.

The homogenisation in step d) may be carried out in a single stage or in multiple stages, for example in two stages. If the homogenisation is carried out in a single stage, then the pressure at which the homogeniser is operated is as indicated above. In such a case the pressure of the single stage homogenisation is at least 350 bar, preferably at least bar. In case the emulsion is homogenised in a sequence of two or more stages, then the sum of pressures of the individual stages is then equal to the pressure that would be applied when a single homogenisation stage would be used. For example if two homogenisation stages are used, then the sum of the two pressures of the individual stages is at least 350 bar, preferably at least 450 bar. For example, if the pressure of a single stage would be 500 bar, then the two pressures of the two individual stages could be 300 bar and 200 bar, or 350 bar and 150 bar. It is within the scope of the present invention that the total homogenisation pressure is achieved using two or more homogenisation stages.

The homogenisation in step d) is done during a time period long enough that the dispersed oil phase typically has a volume weighted geometric mean diameter D3,3 of less than 10 micrometer, preferably from 0.3 to 10 micrometer, preferably from 0.5 to micrometer. Preferably the oil droplets of the emulsion obtained in step d) have a volume weighted geometric mean droplet size D3,3 of less than 6 micrometer. This mean diameter may suitably be determined using the method described by Goudappel et al. (Journal of Colloid and Interface Science 239, p. 535-542, 2001).

Preferably the emulsion obtained from step d) is neither pasteurised nor sterilised. Most preferred neither the mixture from step c) nor the emulsion from step d) is pasteurised or sterilised.

The mixture in step a) and/or c) may comprise one or more hydrocolloids. In case one or more hydrocolloids are present, then these one or more hydrocolloids preferably comprise starch, more preferred native starch or modified starch or combinations of native and modified starch. Preferably the concentration of starch, preferably comprising native and/or modified starch, in the mixture in step a) or c) is maximally 5% by weight, preferably maximally 4% by weight. More preferred the concentration of starch in the mixture in step a) or c) is maximally 2% by weight, preferably maximally 1% by weight. More preferred, the concentration of starch, comprising native starch and/or modified starch, is maximally 0.5% by weight. More preferred starch, comprising native starch and/or modified starch, has a concentration of maximally 0.1% by weight. Mostly preferred starch, preferably comprising native starch and/or modified starch, is essentially absent from the mixtures in step a) or c).

Preferably the concentration of starch, preferably comprising native starch and/or modified starch, in the emulsion obtained from step d) is maximally 2% by weight, preferably maximally 1.5% by weight. More preferred the concentration of starch, preferably comprising native starch and/or modified starch, in the emulsion in step d) is maximally 1% by weight, preferably maximally 0.5% by weight. More preferred starch, preferably comprising native starch and/or modified starch, is essentially absent from the emulsion prepared in step d). Most preferred starch, preferably comprising native starch and/or modified starch, is absent from the emulsion prepared in step d).

Most preferred the emulsion obtained from step d) is free from polymeric water structurants other than the cellulosic fibres. Therefore the emulsion obtained from step d) preferably is free from starch, native starch, modified starch, gums, pectins, and other hydrocolloids. Additionally, preferably no other polymeric water structurants are added to the emulsion that is obtained from step d). In that case the concentration of the cellulosic fibre in the emulsion preferably ranges from 2% to 3.5% by weight, more preferred from 2% to 3% by weight. These ranges and requirements are particularly preferred when the oil concentration in the emulsion obtained from step d) ranges from 25% to 65% by weight, preferably from 25% to 45% by weight.

Alternatively, gelatinised starch or modified starch may be added to the emulsion obtained from step d) by a subsequent process step e):

e) mixing an aqueous dispersion of gelatinised starch or modified starch with the emulsion obtained from step d).

Preferably this step e) is performed using a conventional mixer for preparing oil-in-water emulsions, such as a regular colloid mill, or another mill as described in WO 02/069737 A2. More preferably this step e) is not performed using a high pressure homogeniser, as this leads to loss of functionality of starch granules.

A dispersion of gelatinised starch may be prepared by heating a dispersion of native starch in water, to gelatinise the starch. This process is known to the skilled person. In case starch is added to the emulsion from step d), the concentration of starch in the final obtained emulsion preferably ranges from 0.1 to 4% by weight, preferably from 0.5% to 4% by weight. In that case the concentration of the cellulosic fibre in the emulsion preferably ranges from 0.5% to 3.5% by weight, more preferred from 0.5% to 3% by weight. These ranges and requirements are particularly preferred when the oil concentration in the emulsion obtained from step d) ranges from 10% to 25% by weight, preferably from 15% to 25% by weight. The more starch is contained in the final emulsion, the less cellulosic fibre is required.

The emulsion prepared according to the method of the invention may contain ingredients which are common to this type of emulsions, such as sugars, acids, salt, preservatives, anti-oxidants, spices, herbs, vegetable pieces, flavours, mustard, and dairy ingredients. Generally sugars, acids, salt, preservatives, anti-oxidants, flavours, mustard, and dairy ingredients can be ingredients in the mixture in step c). Flavours, spices, herbs, and vegetable pieces may be mixed with the emulsion obtained from step d) or step e) or simultaneous with step e), to prepare an emulsion containing one or more of these ingredients.

The emulsion obtained in step d) or step e) composition of invention typically is spoonable as opposed to solid or pourable. The firmness of the composition can be characterised by the Stevens value of the composition, which determines the hardness of the composition. The emulsion preferably has a Stevens value at 20° C. ranging from 80 gram to 240 gram, preferably from 100 gram to 220 gram, more preferably ranging from 120 to 200 gram. The Stevens value is determined at 20° C. by using a Stevens LFRA Texture Analyser (ex Brookfield Viscometers Ltd., UK) with a maximum load/measuring range of 1000 grams, and applying a penetration test of 25 mm using a grid, at 2 mm per second penetration rate, in a cup having a diameter of 65 mm, that contains the emulsion; wherein the grid comprises square openings of approximately 3×3 mm, is made up of wire with a thickness of approximately 1 mm, and has a diameter of 40 mm. This methodology is further described herein in the experimental section.

Preferably the emulsion obtained from step d) or step e) is filled into a package. This way it can become available to consumers. The packaging may be any packaging usually used for oil-in-water emulsions. The packaging may be done in any way known to the skilled person.

In a second aspect the present invention provides a packaged composition in the form of an oil-in-water emulsion obtained by the method according to the first aspect of the invention. The packaging may be done using any regular packaging equipment, using any regular type of packaging material for this kind of emulsions.

DESCRIPTION OF FIGURES

FIG. 1: Picture of grid used for determining the Stevens value of oil-in-water emulsions as used herein.

EXAMPLES

The following non-limiting examples illustrate the present invention.

Raw Materials:
Citrus fibre: Herbacel Type AQ Plus Type N, ex Herbafood Ingredients GmbH (Werder (Havel), Germany).
Egg yolk stabilised 92-8: ex Bouwhuis Enthoven (Raalte, the Netherlands). In this product the phospholipids from egg yolk are subjected to an enzymatic process using phospholipase A2, leading to split off of the fatty acid chains from the phospholipid molecules. The fragments are retained in the sample.
The sample contains 92% enzyme-modified egg yolk and 8% NaCl.
Egg yolk powder: ex Igreca (Seiches-sur-le-Loir, France).
Rapeseed oil ex Unilever Netherlands (Rotterdam, Netherlands).
Sunflower oil ex Unilever Netherlands (Rotterdam, Netherlands).
Sucrose: white sugar W4 ex Suiker Unie (Oud Gastel, Netherlands).
Sorbic acid: ex Univar (Zwijndrecht, Netherlands).
Vinegar: 12% Branntweinessig ex Carl Kühne (Hamburg, Germany).
Lemon juice: 45° brix cloudy ex Döhler (Darmstadt, Germany).
Salt: NaCl suprasel ex Akzo Nobel (Amersfoort, Netherlands).
EDTA: Dissolvine E-CA-10 ex Akzo Nobel (Amersfoort, Netherlands).
Pepper aquaresin: ex Kalsec (Mildenhall, Suffolk, UK).

Methods

Syneresis:

Syneresis in an oil-in-water emulsion is the expelling of aqueous liquid, which separates from the product during storage after disrupting the structure by e.g. spooning. In this test gravimetric drip of expelled water from an oil-in-water emulsion into an acrylic cylinder is determined during a storage period at various climate conditions.

Materials: Acrylic cylinder (length 45 mm, inner diameter 21 mm, wall thickness 2 mm, open at two ends) and qualitative filter paper, type 415, diameter 75 mm (ex VWR, Amsterdam, Netherlands). The filter is applied at one end of the cylinder and attached to the wall by tape. The tube with filter is vertically inserted into an emulsion sample of 225 mL in a jar, until the top of the cylinder is at level with the emulsion surface. The jar is closed with a lid, and stored at 5° C. or 20° C. The amount of liquid in the tube is determined by taking out the liquid from the tube (which has passed through the filter into the tube) with a pipette, and weighing the amount of liquid (in gram) after a determined amount of time. A syneresis of less than 1 gram per jar is considered to be a measure for a good quality product. Usually measurements are done in duplicate.

Stevens Value in Gram:

the hardness of the emulsions is determined by using the Stevens value. The Stevens value is determined at 20° C. by using a Stevens LFRA Texture Analyser (ex Brookfield Viscometers Ltd., UK) with a maximum load/measuring range of grams, and applying a penetration test of 25 mm using a grid, at 2 mm per second penetration rate, in a cup having a diameter of 65 mm, that contains the emulsion; wherein the grid comprises square openings of approximately 3×3 mm, is made up of wire with a thickness of approximately 1 mm, and has a diameter of 40 mm. One end of a shaft is connected to the probe of the texture analyser, while the other end is connected to the middle of the grid. The grid is positioned on the flat upper surface of the emulsion in the cup. Upon starting the penetration test, the grid is slowly pushed downward into the emulsion by the texture analyser. The peak force exerted on the probe is recorded and translated into the Stevens value in gram. A photograph of the grid is given in FIG. 1. The grid is made from stainless steel, and has 76 holes, each hole having a surface area of approximately 3×3 mm.

Example 1

Preparation of Oil-in-Water Emulsions and Influence of Heating Temperature of Citrus Fibre Dispersion Various oil-in-water emulsions were prepared having the composition as in table 1. The composition is given as consisting of various phases, and the composition of each phase is provided in the next table. The citrus fibre phase of each emulsion was heated to a different temperature, in order to investigate the influence of this temperature on the properties of the emulsions.

TABLE 1

Composition of oil-in-water emulsions for testing effect heating on citrus fibre dispersion.

| Phase with ingredients | Concentration [wt %] | |
|---|---|---|
| citrus fibre phase | 54.30 | |
| citrus fibre | | 2.22 |
| demineralised water | | 48.91 |
| lemon juice | | 0.035 |
| sorbic acid | | 0.12 |
| sucrose | | 3.00 |
| EDTA | | 0.0077 |
| aqueous phase | 2.40 | |
| vinegar | | 2.40 |
| egg yolk phase | 9.56 | |
| egg yolk stabilised | | 3.00 |
| salt | | 1.56 |
| demineralised water | | 5.00 |
| pepper aquaresin | | 0.0050 |
| oil phase | 33.74 | |
| rapeseed oil | | 33.74 |

Preparation Citrus Fibre Phase:

Ingredients of the citrus fibre phase were dispersed in water (sorbic acid was mixed with sucrose before dissolving in water). This was heated to the required temperature (no heating, 40, 50, 85 or 95° C.), and held for either 1, 5 or 15 minutes. Subsequently it was cooled to less than 30° C.

Preparation Egg Yolk Phase:

The ingredients were added to water and manually mixed.

Preparation Oil-in-Water Emulsion:

Citrus fibre phase was added to the container of a Hobart mixer (a table top mixer with a capacity of about 3 kg, with a rotating container and an impeller, ex Hobart (Woerden, Netherlands)). Egg yolk phase was added. This was mixed for 30 seconds at speed 1, and then speed was increased to 2. Oil was added in about 2 minutes. The aqueous phase was added at 75% of oil intake. The mixture was then mixed for 30 seconds at speed 2, and homogenised at 550 bar in a high pressure homogeniser.

The influence of the heating time and temperature on the syneresis after 6 weeks storage at 20° C. and the hardness of the emulsions (Stevens value) is given in the following table.

TABLE 2

Syneresis and hardness (Stevens value) as function of heating temperature of citrus fibre phase, heating time 5 minutes.

| Heating tempera- ture [° C.] | Syneresis in gram at 20° C. [#] | | | | Stevens value in gram at 20° C. [&] | | | |
|---|---|---|---|---|---|---|---|---|
| | 0 min. heating | 1 min. heating | 5 min. heating | 15 min. heating | 0 min. heating | 1 min. heating | 5 min. heating | 15 min. heating |
| 25 | 3.5 | | | | 162 | | | |
| 40 | | | 0 | 0 | | | 238 | 230 |
| 50 | | | 0 | 0.75 | | | 229 | 213 |
| | | | 1 * | | | | 220 * | |
| 85 | | | 0.5 | | | | 242 | |
| 95 | | 0.25 | 0 | | | 267 | 262 | |
| | | | 0 * | | | | | |

[#] in gram, at 6 weeks storage time at 20° C.
[&] in gram at 20° C., at 24 hours storage time
* duplicate measurements These data show that heating the citrus fibre phase at a temperature of 40° C. already drastically decreases the syneresis. A syneresis value of 1 gram or lower is considered to be a good value. The syneresis decreases from 3.5 gram to 0 gram by 5 minutes heating of the citrus fibre phase at 40° C. Also the hardness of the emulsions increases drastically from 162 to 238 gram by 5 minutes heating of the citrus fibre phase at 40° C. The highest Stevens values are obtained at a temperature of 95° C.; the heating time (1 or 5 minutes) does not have a large influence.

Example 2

Influence of Homogenisation of Emulsion

An emulsion was prepared in a similar way as described in WO 2012/104398 A1, according to the following recipe and processing method.

TABLE 3

Composition of oil-in-water emulsions for testing effect of homogenisation of final emulsion.

| Phase with ingredients | Concentration [wt %] | |
|---|---|---|
| aqueous phase | 14.4 | |
| demineralised water | | 5.00 |
| Vinegar | | 2.51 |
| Sucrose | | 2.91 |
| Salt | | 0.99 |
| egg yolk powder | | 3.00 |
| citrus fibre phase | 56.2 | |
| demineralised water | | 52.81 |
| sunflower oil | | 0.56 |
| sucrose | | 1.41 |
| citrus fibre | | 1.41 |
| oil phase | 29.4 | |
| sunflower oil | | 29.4 |

Preparation Citrus Fibre Phase:

Sucrose, oil, citrus fibre, and water were added to a Stephan UM 5 Universal cooker (a double jacketed vessel for temperature control, equipped with a high shear mixer and a scraper for cleaning the walls of the vessel, ex Stephan Machinery (Hameln, Germany)). The mixture was stirred at 3,000 rpm under 0.5 bar at room temperature for 5 minutes. Then the mixture was heated to 85° C. for 3 minutes at 3,000 rpm at 0.5 bar. Subsequently the mix was cooled to less than 25° C. under stirring at 500 rpm at 0.5 bar. Then the mix was homogenised using a high pressure homogeniser in two stages at 100 bar and 40 bar.

Preparation Aqueous Phase:

All ingredients were mixed using a mechanical mixer at room temperature.

Preparation Oil-in-Water Emulsion:

The aqueous phase was added to a Stephan cooker. Oil was added at 3,000 rpm under 0.5 bar in about 2-3 minutes. Citrus fibre phase was added at 2500 rpm under 0.5 bar in 1 minute. This sample was called '885' (comparative sample).

Two emulsions having the same composition as in table 3 were prepared, one of them according to the method of the invention:

Preparation Citrus Fibre Phase:

This phase was prepared at two different heating temperatures.

Without heating: All ingredients were dispersed in water at room temperature, and hydrated for 5 minutes.

With heating: All ingredients were dispersed in water, heated to 85° C., held for 5 minutes, and cooled to less than 30° C.

Preparation Aqueous Phase:

The ingredients without egg yolk powder were added to water and mixed manually. Egg yolk powder was added, and mixed manually.

Preparation Oil-in-Water Emulsions:

The citrus fibre phases were each added to a hobart mixer. Aqueous phase was added on top. This was mixed for 30 seconds at speed 1, and then speed was increased to 2. Oil was added in 2 minutes, mixed for 30 seconds at speed 2. Finally the pre-emulsions were homogenised at 550 bar in a high pressure homogeniser.

The product without heating of the citrus fibre phase was called: 'U25' (comparative). The product with heating of the citrus fibre phase was called: 'U85' (invention).

The following syneresis values and hardness (Stevens values) were determined for the prepared emulsions:

TABLE 4

Syneresis and hardness (Stevens value), influence of heating temperature and homogenisation.

| Sample | Syneresis in gram at 20° C.[#] | Stevens value in gram at 20° C.[&] |
|---|---|---|
| B85 (comparative) | 7.5 | 45 |
| U25 (comparative) | 6 | 130 |
| U85 (invention) | 6 | 140 |

[#] in gram at 20° C., at 6 weeks storage time
[&] in gram at 20° C., at 1 week storage time
* duplicate measurements In all cases the syneresis is high, due to a relatively low amount of citrus fibre in the emulsions. Nevertheless the method of the invention leads to less syneresis and thus a more stable emulsion than the method of WO 2012/104398 A1.

The effect of the method of the invention on the hardness of the emulsion was dramatic: this increased from 45 to 140 gram. An emulsion having this Stevens value has the correct and desired hardness. This shows that the method of the invention is improved with regard to syneresis and hardness. The heating of the dispersion of fibres, and the homogenisation at 550 bar lead to a strong increase of the Stevens value, as compared to the reference sample B85, in which the fibre dispersion is only heated, and not homogenised at a high pressure.

The invention claimed is:

1. A method for preparation of an oil-in-water emulsion comprising the steps:
    a) providing dry cellulosic fibres that have been isolated from citrus pulp made from citrus peel followed by;
    b) dispersing the cellulosic fibres in water to obtain an aqueous dispersion of cellulosic fibres at a concentration ranging from 1 to 5% by weight, wherein the cellulosic fibres are water-insoluble citrus fibres, wherein the concentration of oil is maximally 1% by weight, and wherein the dispersion has been subjected to a heating process at a temperature of 40-85° C. for 5 to 15 min or at a temperature of 50-99° C. for 1-5 min; and
    c) optionally homogenizing the dispersion from step b) in a high pressure homogenizer at a pressure of at least 250 bar;
    d) mixing the dispersion from step b) or, in case step c) has been performed the dispersion from step c), with
        20% to 80% by weight of water,
        5% to 70% by weight of oil,
        0.1% to 5% by weight of one or more food acids, and
        0% to 10% by weight of dry matter from other edible ingredients,
    to prepare a pre-emulsion having a pH ranging from 2 to 5; and
    e) homogenizing the mixture from step d) to produce the emulsion having oil droplets with a volume weighted geometric mean droplet size D3,3 of less than 10 micrometer, and
    in case the mixture from step b) has been combined with the other ingredients of the emulsion in step d), without performing step c), then homogenization is performed in a high pressure homogenizer at a pressure of at least 350 bar,
    wherein the syneresis of the resulting oil-in-water emulsion is decreased as compared to the syneresis of an equivalent oil-in-water emulsion wherein the aqueous dispersion of cellulosic fibres has not been subjected to said heating process, when measured after at least six weeks of storage at 20° C.

2. A method according to claim 1, wherein in step c) the dispersion from step b) is homogenized in a high pressure homogenizer at a pressure of at least 250 bar; and
    in step d) the dispersion from step c) is mixed with
        20% to 80% by weight of water,
        5% to 70% by weight of oil,
        0.1% to 5% by weight of one or more food acids, and
        0% to 10% by weight of dry matter from other edible ingredients,
    to prepare a pre-emulsion having a pH ranging from 2 to 5; and
    in step e) the mixture from step d) is homogenised to produce the emulsion.

3. A method according to claim 1, wherein in step d) the dispersion from step b), without performing step c), is mixed with
    20% to 80% by weight of water,
    5% to 70% by weight of oil,
    0.1% to 5% by weight of one or more food acids, and 0% to 10% by weight of dry matter from other edible ingredients, to prepare a pre-emulsion having a pH ranging from 2 to 5; and in step e) the mixture from step d) is homogenised to produce the emulsion in a high pressure homogeniser at a pressure of at least 350 bar.

4. A method according to claim 1, wherein the emulsion is an edible emulsion.

5. A method according to claim 1, wherein in step b) the concentration of cellulosic fibre ranges from 2% to 5% by weight.

6. A method according to claim 1, wherein the concentration of the cellulosic fibre in the emulsion prepared in step e) ranges from 0.5% to 4% by weight.

7. A method according to claim 1, wherein the mixture in step d) comprises egg yolk, whole egg, or enzyme modified egg yolk, or combinations thereof.

8. A method according to claim 1, wherein the concentration of oil in the mixture in step b) is less than 0.5% by weight.

9. A method according to claim 1, wherein the concentration of oil in the emulsion prepared in step e) ranges from 10% to 65% by weight.

10. A method according to claim 1, wherein the concentration of starch, in the emulsion obtained from step e) is maximally 2% by weight.

11. A method according to claim 1, wherein the emulsion obtained from step e) is free from polymeric water structurants other than the cellulosic fibres.

12. A packaged composition in the form of an oil-in-water emulsion obtained by the method according to claim 1.

13. A method according to claim 4, wherein the edible emulsion is a mayonnaise.

14. A method according to claim 5, wherein in step b) the concentration of cellulosic fibre ranges from 2.5% to 4.7% by weight.

15. A method according to claim 6, wherein the concentration of the cellulosic fibre in the emulsion prepared in step e) ranges from 2% to 3.5% by weight.

16. A method according to claim 8, wherein the concentration of oil in the mixture in step b) is less than 0.1% by weight.

17. A method according to claim 9, wherein the concentration of oil in the emulsion prepared in step e) ranges from 12% to 55% by weight.

18. A method according to claim 1, wherein the concentration of starch, in the emulsion obtained from step e) is maximally 1.5% by weight.

19. The method according to claim 1, wherein the hardness of the resulting oil-in-water emulsion is increased as compared to the hardness of an equivalent oil-in-water emulsion wherein the aqueous dispersion of cellulosic fibres has not been subjected to said heating process, when measured after at least 24 hours of storage at 20° C.

* * * * *